(12) United States Patent
Mimura et al.

(10) Patent No.: US 9,573,082 B2
(45) Date of Patent: Feb. 21, 2017

(54) UPPER-LAYER CLEANING DEVICE FOR WATER TREATMENT DEVICE, AND METHOD FOR CLEANING WATER TREATMENT DEVICE FILTER LAYER

(75) Inventors: Hitoshi Mimura, Osaka (JP); Tadao Oiwa, Osaka (JP); Hui Lang Cai, Osaka (JP)

(73) Assignee: NAGAOKA INTERNATIONAL CORPORATION, Osaka (JP)

( * ) Notice: Subject to any disclaimer, the term of this patent is extended or adjusted under 35 U.S.C. 154(b) by 35 days.

(21) Appl. No.: 14/234,966

(22) PCT Filed: Jul. 5, 2012

(86) PCT No.: PCT/JP2012/067146
§ 371 (c)(1),
(2), (4) Date: Feb. 7, 2014

(87) PCT Pub. No.: WO2013/015090
PCT Pub. Date: Jan. 31, 2013

(65) Prior Publication Data
US 2014/0190907 A1 Jul. 10, 2014

(30) Foreign Application Priority Data

Jul. 25, 2011 (JP) .................................. 2011-161980

(51) Int. Cl.
*B01D 24/46* (2006.01)
*C02F 1/64* (2006.01)
(Continued)

(52) U.S. Cl.
CPC ............. *B01D 24/4636* (2013.01); *C02F 1/64* (2013.01); *C02F 1/74* (2013.01); *C02F 3/06* (2013.01);
(Continued)

(58) Field of Classification Search
None
See application file for complete search history.

(56) References Cited

U.S. PATENT DOCUMENTS 243,212 A * 6/1881 Clark .................... B01D 24/22
 210/273
478,261 A * 7/1892 Jewell .................... C02F 1/001
 169/24

(Continued)

FOREIGN PATENT DOCUMENTS

JP 1992-126702 U 11/1992
JP 2002-126768 A 5/2002
(Continued)

*Primary Examiner* — Robert James Popovics
(74) *Attorney, Agent, or Firm* — Florek & Endres PLLC

(57) ABSTRACT

Water treatment apparatus includes raw water special air mixing nozzles (7); filtering tank (5) housing filter layer (4) including two layers of upper layer (2) and lower layer (3), the upper layer including a filter medium with a smaller specific gravity and a larger particle size than a filter medium of the lower layer; a water collection pipe (13) removing filtered water and supplying reverse cleaning water to the filter layer during reverse cleaning; drainage trough (12); and upper layer cleaning apparatus (10), in which the upper layer cleaning apparatus includes upper layer cleaning pipe support member (17), upper layer cleaning water pipe (18), surface-cleaning special air mixing nozzles (19), air suction pipe (20), and horizontal air pipes (31 and 32) and the raw water special air mixing nozzles (7) are attached to raw water inflow tank (70) provided on a part of the drainage trough (12).

4 Claims, 11 Drawing Sheets

(51) Int. Cl.
*C02F 3/34* (2006.01)
*C02F 3/06* (2006.01)
*C02F 1/74* (2006.01)
*C02F 103/06* (2006.01)
*C02F 1/28* (2006.01)
*C02F 101/20* (2006.01)

(52) U.S. Cl.
CPC ............ *C02F 3/346* (2013.01); *C02F 1/283* (2013.01); *C02F 2101/203* (2013.01); *C02F 2101/206* (2013.01); *C02F 2103/06* (2013.01); *C02F 2209/40* (2013.01); *C02F 2303/16* (2013.01); *Y02W 10/15* (2015.05)

(56) References Cited

U.S. PATENT DOCUMENTS

| | | | | |
|---|---|---|---|---|
| 554,312 A * | 2/1896 | Robinson | B01D 24/007 | 210/272 |
| 949,455 A * | 2/1910 | Usher | C22B 11/04 | 210/279 |
| 1,748,898 A * | 2/1930 | Peebles | B01D 24/205 | 210/270 |
| 2,296,824 A * | 9/1942 | Ashworth | B01D 24/24 | 210/273 |
| 2,302,449 A * | 11/1942 | Laughlin | B01D 24/005 | 210/271 |
| 2,309,916 A * | 2/1943 | Palmer | 210/795 | |
| 2,309,917 A * | 2/1943 | Palmer | 210/272 | |
| 2,311,594 A * | 2/1943 | Lose, Jr. | B01D 23/16 | 210/136 |
| 2,351,835 A * | 6/1944 | Pick | B01D 23/10 | 210/273 |
| 2,355,815 A * | 8/1944 | McGill | B01D 24/14 | 210/191 |
| 2,445,287 A * | 7/1948 | Woods | B01D 24/008 | 210/146 |
| 2,538,340 A * | 1/1951 | Tomek | B01D 24/24 | 134/186 |
| 2,769,547 A | 11/1956 | Hirsch | | |
| 2,773,829 A * | 12/1956 | Hunting | B01J 49/0078 | 210/279 |
| 2,880,874 A * | 4/1959 | Ferrara | 210/272 | |
| 3,039,612 A * | 6/1962 | Palmer | 210/272 | |
| 3,172,846 A * | 3/1965 | Hirs | 210/741 | |
| 3,215,274 A * | 11/1965 | Schreiber | 210/150 | |
| 3,239,061 A * | 3/1966 | Horning | B01D 24/005 | 137/625.11 |
| 3,288,297 A * | 11/1966 | Stuart | 210/272 | |
| 3,292,788 A * | 12/1966 | Schwartz | B01D 24/14 | 210/272 |
| 3,374,896 A * | 3/1968 | Palmer | 210/272 | |
| 3,379,380 A * | 4/1968 | McGivern | 239/254 | |
| 3,384,240 A * | 5/1968 | Berardi | B01D 24/14 | 210/136 |
| 3,402,126 A * | 9/1968 | Cioffi | B01J 47/04 | 210/279 |
| 3,412,863 A * | 11/1968 | Stuart, Sr. | 210/793 | |
| 3,493,116 A * | 2/1970 | Edmiston | B01D 24/4631 | 210/266 |
| 3,564,570 A * | 2/1971 | Lincoln et al. | B01D 46/30 | 210/273 |
| 3,587,975 A * | 6/1971 | Moffett | 39/428.5 | |
| 3,617,558 A * | 11/1971 | Jones | B01J 39/043 | 210/279 |
| 3,675,850 A * | 7/1972 | Ebert | 239/254 | |
| 3,680,701 A * | 8/1972 | Holca | B01D 24/007 | 210/274 |
| 3,698,554 A * | 10/1972 | Mail | B01D 24/008 | 210/274 |
| 3,897,000 A * | 7/1975 | Mandt | 239/722 | |
| 3,954,620 A * | 5/1976 | Nebolsine | B01D 24/4636 | 210/275 |
| 4,118,320 A * | 10/1978 | Stuart | B01D 24/22 | 210/274 |
| 4,161,963 A * | 7/1979 | Stevens | B01D 24/14 | 137/592 |
| 4,184,893 A * | 1/1980 | Halvorson | B01J 49/0078 | 134/25.1 |
| 4,187,175 A * | 2/1980 | Roberts | B01D 24/22 | 210/108 |
| 4,322,299 A * | 3/1982 | Scholten | B01D 24/007 | 210/290 |
| 4,482,461 A * | 11/1984 | Hindman et al. | 210/741 | |
| 4,486,307 A * | 12/1984 | Weiler | B01D 24/22 | 210/275 |
| 4,624,783 A * | 11/1986 | Black | B01D 24/002 | 210/271 |
| 4,627,923 A * | 12/1986 | Ross | B01D 24/22 | 134/25.1 |
| 4,859,330 A * | 8/1989 | Pauwels | B01D 24/005 | 210/264 |
| 4,957,631 A * | 9/1990 | Pauwels | B01D 24/005 | 210/264 |
| 5,061,080 A * | 10/1991 | MacKay et al. | 366/170.4 | |
| 5,078,873 A * | 1/1992 | Black | B01D 24/005 | 210/264 |
| 5,269,923 A * | 12/1993 | Diemer | B01D 29/055 | 210/413 |
| 5,407,574 A * | 4/1995 | Hensley | B01D 24/12 | 210/269 |
| 5,891,335 A * | 4/1999 | Kupke | B01D 24/005 | 210/271 |
| 6,287,474 B1 * | 9/2001 | Dean | B01D 24/4673 | 210/276 |
| 7,014,758 B2 * | 3/2006 | Nagaoka | B01D 24/14 | 210/205 |
| 7,097,766 B2 * | 8/2006 | Moya | 210/272 | |
| 7,341,662 B2 * | 3/2008 | Tolley | B01D 24/14 | 210/275 |
| 8,012,359 B2 * | 9/2011 | Parkinson | B01D 24/008 | 210/186 |
| 8,110,116 B2 * | 2/2012 | Mimura | B01D 24/10 | 210/269 |
| 9,174,149 B2 * | 11/2015 | Lee | B01D 24/14 | |
| 9,295,929 B2 * | 3/2016 | Flores | B01D 24/14 | |
| 9,387,418 B2 * | 7/2016 | Bosisio | B01D 24/14 | |
| 2003/0080039 A1 * | 5/2003 | Cocoli | B01D 24/4621 | 210/275 |
| 2004/0040904 A1 * | 3/2004 | Nagaoka | B01D 24/14 | 210/209 |
| 2004/0238430 A1 * | 12/2004 | Moya | B01D 24/14 | 210/280 |
| 2005/0035071 A1 * | 2/2005 | Tolley | B01D 24/14 | 210/793 |
| 2010/0176071 A1 * | 7/2010 | Mimura et al. | 210/798 | |
| 2010/0320159 A1 * | 12/2010 | Lee | B01D 24/14 | 210/792 |
| 2014/0014598 A1 * | 1/2014 | Bosisio | B01D 24/14 | 210/807 |
| 2014/0190907 A1 * | 7/2014 | Mimura et al. | 210/794 | |
| 2015/0034569 A1 * | 2/2015 | Liberman | B01D 24/205 | 210/798 |
| 2015/0190738 A1 * | 7/2015 | Bosisio | B01D 24/14 | 210/807 |
| 2016/0114265 A1 * | 4/2016 | Liberman | B01D 24/4689 | 210/271 |
| 2016/0250571 A1 * | 9/2016 | Bloomfield | B01D 24/14 | |

FOREIGN PATENT DOCUMENTS

JP 2010-264334 A 11/2010
JP 2011-011116 A 1/2011

* cited by examiner

RELATIONSHIP BETWEEN NUMBER OF ROTATIONS AND NOZZLE ANGLE

UPPER-LAYER CLEANING DEVICE FOR WATER TREATMENT DEVICE, AND METHOD FOR CLEANING WATER TREATMENT DEVICE FILTER LAYER

TECHNICAL FIELD

The present invention relates to a cleaning apparatus of a water treatment apparatus. In particular, the invention relates to an upper layer cleaning apparatus of a water treatment apparatus that can remove iron, manganese, and other soluble components in ground water or the like by oxidizing and insolubilizing these components using a simple and compact apparatus without using chemicals such as an oxidizing agent and a flocculant, and to a method for cleaning a filter layer of the water treatment apparatus.

BACKGROUND ART

Ground water is used as raw water for tap water and in industries requiring a large amount of water, such as food industry, soft drink, brewing, public baths, and dyeing industry. Meanwhile, currently, iron and manganese components contained in ground water are a major problem. Iron and manganese are components necessary for human body. However, iron or manganese exceeding certain amounts give water a metallic taste or cause red or black water. Such water is not only suitable for drinking but causes various problems in these industries. In addition, in construction work, extraction of ground water is an essential process. However, when the ground water contains large amounts of iron and manganese, discarding the ground water directly in sewage system is prohibited by law, and there is a problem in that the ground water must be discarded after removing iron and manganese contained in the ground water.

Currently, the most widely used apparatuses for removing iron and manganese add an oxidizing agent such as sodium hypochlorite or a flocculant such as polyaluminium chloride (PAC) into the raw water to oxidize iron and manganese dissolved in water so as to produce insoluble iron oxide and manganese oxide and then filter away the oxides through filter sand.

However, the water treatment apparatuses by method of adding an oxidizing agent or a flocculant consume a relatively large amount of the oxidizing agent or flocculant, thus increasing cost for these agents. In addition, since sodium hypochlorite used as the oxidizing agent remains in the post-treatment cleaning water even after the oxidation of iron and manganese, it produces trihalomethane, which is a carcinogen. Accordingly, in order to remove the substance, filtering of the water through an activated carbon layer is further needed, which is uneconomical. If the installation of the activated carbon layer is deferred due to economic considerations, it is necessary to analyze and monitor, constantly, water after filtering to adjust the amount of an oxidizing agent added according to the situation, in order to prevent the production of trihalomethane due to an excessive addition of the oxidizing agent. This is disadvantageous in terms of increasing maintenance and operation cost in addition to purchase cost for the chemical agent. Additionally, the water treatment apparatuses by method of adding a chemical agent include an aeration tank, a flocculation tank, a precipitation tank, a sand filter tower, an iron and manganese removing tower, and a chemical agent tank, where system is complicated and the entire apparatus is large-scaled, thus necessitating a wide installation space. Accordingly, there is a problem in that such apparatuses cannot be installed in environments where space is limited, such as city areas. Furthermore, in the water treatment apparatuses by method of adding a chemical agent, treatment of wastewater after cleaning is necessary. However, in that case, since the sand contains the chemical agent, the wastewater must be treated as an industrial waste, and there are inconveniences such as disposal site restrictions.

A water treatment apparatus disclosed in Patent Literature 1 has been proposed to remove the disadvantages of the conventional water treatment apparatuses adding a chemical agent and provide a water treatment apparatus that can remove iron, manganese, and other soluble components contained in ground water or the like by oxidation and insolubilization of these components using a simple and compact apparatus without using chemicals such as oxidizing agents and flocculants. In this water treatment apparatus, while jet nozzles turn raw water into a jet water stream, air is introduced into the jet nozzles through air inlets or air introducing pipes open to the insides of the jet nozzles. Then, jet streams including a large number of air bubbles from raw water ejection outlets of the nozzles are hit against the surface of water above a filter layer arranged below the ejection outlets to cause fierce aeration in the water and on the surface of a filter medium. This causes soluble components such as iron and manganese in the water to be oxidized and turned into insoluble components, which are then caught on the surface of filter medium particles such as filter sand forming the filter layer. Accordingly, without any use of chemicals such as oxidizing agents and flocculants, the simple and compact apparatus can achieve the insolubilization and filtering of iron, manganese, and other soluble components in raw water.

In addition, as another type of a water treatment apparatus for cleaning a surface layer of a water treatment apparatus, a rotary cleaning apparatus disclosed in Patent Literature 2 is known. In the rotary cleaning apparatus, water is ejected diagonally downward from a plurality of water ejecting nozzles provided in a longitudinal direction of a horizontal rotary pipe attached to a lower end of a vertical rotation shaft to hit against the surface of a filter layer so as to rotate the horizontal rotary pipe in response to the hitting, thereby stirring and cleaning the surface layer of the filter medium by the water ejected from each water ejecting nozzle.

CITATION LIST

Patent Literature

Patent Literature 1: Unexamined Japanese Patent Application Kokai Publication No. 2002-126768.
Patent Literature 2: U.S. Pat. No. 2,769,547.

SUMMARY OF INVENTION

Technical Problem

In the water treatment apparatus disclosed in Patent Literature 1 above and other same-type water treatment apparatuses, the removal of iron formed into a film is always both excessive and insufficient in the upper layer portion and the lower layer portion of the filter layer. In addition, while it is easy to say that iron and manganese are removed, there is a difficulty in doing that. As will be described later, iron is formed into a film by oxidation effect on the upper layer portion of the filter layer, whereas manganese is caught on the surface of filter medium particles by biological treatment in the lower layer portion of the filter layer. When the concentration of iron in raw water is significantly higher than that of manganese, cleaning the entire filter layer with a large amount of cleaning water in order to remove iron caught on the upper layer portion of the filter layer causes an organism existing for the treatment of manganese in the lower layer portion to be washed away together with the iron, thereby interfering with the biological treatment of manganese after that.

On the other hand, it is advantageous for a water treatment apparatus that the size of the apparatus and the space therefor can be further reduced as the filtering speed of the apparatus per unit time increases. Particularly, in a case in which there is not enough space available to install a water treatment apparatus due to the location for installation and it is impossible to install a large scale apparatus, filtering of a required amount of raw water needs to be performed by a small scale apparatus installed in the narrow space, causing an urgent need to increase the filtering speed.

An important condition necessary for increasing the filtering speed of a water treatment apparatus is efficient cleaning of the water treatment apparatus.

In a water treatment apparatus, in general, along with the continuation of filtering operation, when the filter layer, particularly, the surface of the layer is covered with flocks of oxides such as iron hydroxide oxide and other foreign substances as time elapses, the filtering function of the filter medium reduces. In this case, filtering treatment needs to be temporarily suspended to clean the filter layer. Accordingly, without the efficient cleaning of the filter layer, high-speed filtering treatment cannot be achieved.

In the water treatment apparatus disclosed in Patent Literature 1 above, the raw water supply pipe is reciprocated on a plane parallel to the surface of the filter layer to release the blocked filter layer from the blocked state by using the jet water streams including the large number of air bubbles ejected from the raw water supply pipe so as to recover the filtering function. Additionally, this water treatment apparatus is configured as follows. A filter layer support made of a plate-like screen supporting the filter layer is arranged in the bottom of the filter layer of a single layer made of filter sand, and below the filter layer support is arranged a reverse cleaning pipe for performing reverse cleaning of the filter layer. When the upper portion of the filter layer, particularly, the surface thereof is covered with flocks of oxides and other foreign substances, the supply of raw water to the filtering tank is temporarily suspended. Then, the reverse cleaning pipe allows reverse cleaning water to flow upward from below throughout the entire filter layer via the filter media tank support, so as to separate the foreign substances covering the upper portion of the filter layer from the filter layer, as well as wash away the iron and manganese components caught in the filter layer and discharge the components outside the system from the reverse cleaning water discharging outlet.

The water treatment apparatus has a filtering speed of 60 to 120 m/day. When filtering treatment needs to be performed at a higher speed, cleaning of the filter layer also needs to be more frequently done and such a frequent cleaning further increases an amount of load on the biological treatment in the lower layer portion of the filter layer. Therefore, the water treatment apparatus has limitation in efficient cleaning of the filter layer and further increase of the filtering speed cannot be expected.

In addition, conventional water treatment apparatuses including the above water treatment apparatus need to consume water in an amount of about 10 to 15% with respect to the amount of filtered water in order to perform the cleaning of a filter layer as described above, thus significantly reducing water treatment efficiency.

Additionally, the conventional water treatment apparatus described above is provided with the mechanism for reciprocating the raw water supply pipe on the plane parallel to the surface of the filter layer in order to clean the surface of the filter layer. However, since the mechanism needs to reciprocate the raw water supply pipe by an electric motor, a large amount of power is required for the surface cleaning, as well as the mechanism for reciprocation is complicated. Furthermore, there is a problem in that labor and cost for maintenance of components increase due to the abrasion of rails for moving the raw water supply pipe, the wear of a hose for supplying water to the raw water supply pipe, and the like. In addition, in order to simultaneously move the sequence of the raw water supply pipe arranged linearly, the shape of the filtering tank needs to be rectangular, leading to increase in the size of the apparatus. Accordingly, there is also a problem in that the apparatus cannot be downsized even when the space for installation of the apparatus is narrow.

In addition, in the cleaning apparatus described in Patent Literature 2 above, water ejected from the water ejecting nozzles of the horizontal rotary pipe hits against the surface of the filter layer and the reaction to the hitting allows the rotation of the horizontal rotary pipe. Without any driving device such as the electric motor in Patent Literature 1, the surface layer can be cleaned by the simple apparatus. However, due to the filtering tank with the single layer, there is the same problem as the apparatus described in Patent Literature 1 above. In addition, since the water ejecting nozzles attached to the horizontal rotary pipe eject cleaning water while rotating, the depth that allows for stirring and cleaning of the filter layer is shallower than a case in which cleaning water is ejected from fixed water ejecting nozzles, and even in case of cleaning away only iron caught in a relatively upper portion of the filter layer, stirring and cleaning may not be able to reach a sufficient depth in the layer. Accordingly, this rotary cleaning apparatus has limitation in improving the filtering speed and the filtering speed is only maximum 120 m/day.

Additionally, some conventional water treatment apparatuses produce intense noise during the cleaning of a filter layer. Particularly in cases where the installation space for a water treatment apparatus is limited to a narrow space, noise can be a problem. Therefore, there has been a desire for a water treatment apparatus that produces no noise during the cleaning of a filter layer.

The present invention has been accomplished in view of the problems of the conventional water treatment apparatuses described above. Objectives of the present invention are to provide a novel cleaning apparatus for cleaning a filter layer being capable of performing filtering treatment at higher speed and with less noise than the conventional water treatment apparatuses and a method for cleaning a filter layer using the cleaning apparatus.

Solution to Problem

Through the repeated intensive and extensive research and experiments to solve the above problems, the present inventors focused on the facts that, regarding iron and manganese to be caught by a water treatment apparatus, most of the iron is deposited on the upper layer portion of a filter layer, whereas, conversely, most of the manganese is deposited on the lower layer portion thereof, as well as concentrations of iron and manganese in raw water are not constant but have substantially a constant difference depending on the raw water and usually the concentration of iron is greatly higher than that of manganese. Then, the present applicant utilized these facts for cleaning and succeeded in significantly improving cleaning effect for removing iron in the upper layer portion of the filter layer without producing any noise by cleaning the upper layer portion by a rotary upper layer cleaning apparatus with a plurality of surface-cleaning special air mixing nozzles while loosening the filter medium of the upper layer portion using an upward stream by introducing reverse cleaning water from a reverse cleaning water supply pipe at an upper layer portion cleaning speed. In addition, the present inventors significantly improved the cleaning effect by partial cleaning of the filter layer for removing iron in raw water and overall cleaning of the filter layer for removing manganese. As a result, the inventors succeeded in achieving high speed filtering, which had not conventionally been done, and also in saving cleaning water.

Specifically, in order to achieve the objectives of the present invention, a first constitution of the present invention is an upper layer cleaning apparatus of a water treatment apparatus, the water treatment apparatus comprising a raw water supply pipe; one or a plurality of raw water special air mixing nozzles, one end portion each thereof communicating with the raw water supply pipe and at the other end portion each thereof being provided a raw water ejection outlet ejecting raw water as an air-mixed jet water stream of raw water and air; a filtering tank in circular shape in plan view, the tank housing a filter layer comprising two layers of an upper layer and a lower layer, the upper layer comprising a filter medium with a smaller specific gravity and a larger particle size than a filter medium of the lower layer; a filtered water removal pipe provided in the filtering tank to remove water filtered by the filter layer; a reverse cleaning water supply pipe provided in the filtering tank to supply reverse cleaning water to the filter layer; a drainage trough or a drainage outlet provided above the filter layer in the filtering tank; and an upper layer cleaning apparatus cleaning the upper layer while loosening the filter medium of the upper layer by an upward stream by introducing reverse cleaning water from the reverse cleaning water supply pipe at an upper layer cleaning speed, the raw water special air mixing nozzles being arranged at a predetermined interval above the filter layer or the drainage trough between the raw water ejection outlets and a surface of the filter layer or a bottom surface of the drainage trough, characterized in that the upper layer cleaning apparatus comprises:

an upper layer cleaning pipe support member communicating with an upper layer cleaning water supply pipe and arranged in a radial direction above the filter layer;

an upper layer cleaning water pipe comprising a center cleaning water pipe communicating with the upper layer cleaning pipe support member and rotatably attached to the support member and extending vertically and a pair of horizontal cleaning water pipes connected to a lower end portion of the center cleaning water pipe so as to communicate with the center cleaning water pipe and extending horizontally on both sides of a radial direction from the connected portion;

a plurality of surface-cleaning special air mixing nozzles, an ejection outlet of each thereof protruding from the pair of horizontal cleaning water pipes diagonally downward in a circumferential direction of the filtering tank, a direction of the ejection outlets of the nozzles of one of the horizontal cleaning water pipes being opposite to a direction of the ejection outlets of the nozzles of the other one thereof;

at least one air suction pipe fixed to the center cleaning water pipe and extending vertically; and a pair of horizontal air pipes connected to the air suction pipe so as to communicate with the air suction pipe and extending horizontally along the horizontal cleaning water pipes to be fixed to the horizontal cleaning water pipes, the horizontal air pipes communicating with each of the surface-cleaning special air mixing nozzles by a connection pipe and an upper end portion of the air suction pipe being open to an atmosphere and arranged upper than the drainage trough or the drainage outlet.

A second constitution of the present invention is the upper layer cleaning apparatus of the first constitution, wherein a rotational speed of the upper layer cleaning water pipe is in a range of 3 to 5 rounds/minute.

A third constitution of the present invention is the upper layer cleaning apparatus of the second constitution, wherein an upper limit value of water supply pressure is 0.2 MPa, and, an inclination angle of the surface-cleaning special air mixing nozzles with respect to vertical planes from axial centers of the horizontal cleaning water pipes is in a range of 18 to 22 degrees in case of the water supply pressure being 0.2 Mpa.

A fourth constitution of the present invention is the upper layer cleaning apparatus according to any one of the first to the fourth constitutions, wherein at the upper end portion of the air suction pipe is provided noise production preventing means with an open hole communicating with the air suction pipe, a diameter of the open hole being gradually enlarged toward an open end portion at an upper end portion of the hole to form a taper including an upper lid with at least one small hole.

A fifth constitution of the present invention is a method for cleaning a filter layer of a water treatment apparatus, the water treatment apparatus comprising a raw water supply pipe, one or a plurality of raw water special air mixing nozzles, one end portion each thereof communicating with the raw water supply pipe and at the other end portion each thereof being provided a raw water ejection outlet ejecting raw water as an air-mixed jet water stream of raw water and air; a filtering tank housing a filter layer comprising two layers of an upper layer and a lower layer, the upper layer comprising a filter medium with a smaller specific gravity and a larger particle size than a filter medium of the lower layer; a filtered water removal pipe provided in the filtering tank to remove water filtered by the filter layer; a reverse cleaning water supply pipe provided in the filtering tank to supply reverse cleaning water to the filter layer; a drainage trough or a drainage outlet provided above the filter layer in the filtering tank; and the upper layer cleaning apparatus according to any one of the first to the fourth constitutions, the raw water special air mixing nozzles being arranged at a predetermined interval above the filter layer or the drainage trough between the raw water ejection outlets and a surface of the filter layer or a bottom surface of the drainage trough, characterized in that cleaning of the filter layer is performed by selecting one of a partial cleaning for mainly cleaning the upper layer and an overall cleaning for cleaning both the upper layer and the lower layer, a process of the partial cleaning comprising:

(i) a filtering treatment suspension step of temporarily stopping the supply of the raw water;

(ii) an upper layer cleaning step of cleaning by the upper layer cleaning apparatus according to any one of the first to the fourth constitutions while introducing reverse cleaning water as an upward stream from the reverse cleaning water supply pipe at an upper layer cleaning speed to separate iron hydroxide blocking the surface of the filter medium from the filter medium and clean away the iron hydroxide by the upward stream; and (iii) a turbid water drainage step of draining turbid water including the turbidity component separated from the filter medium of the upper layer from the drainage trough or the drainage outlet by continuing the supply of the upward stream at the upper layer cleaning speed; and a process of the overall cleaning comprising:

(i) a filtering treatment suspension step of stopping the supply of the raw water;

(ii) a cleaning step of cleaning the filter media of the upper layer and the lower layer by operating the upper layer cleaning apparatus while introducing reverse cleaning water from the reverse cleaning water supply pipe at an overall cleaning speed larger than the upper layer cleaning speed and faster than speeds of sedimentation of the filter media;

(iii) a standing step of causing the sedimentation of the filter media of the upper and the lower layers while continuing the supply of an upward stream at a speed not more than the speeds of the sedimentation of the filter media after finishing the cleaning of the filter media of the upper layer and the lower layer; and (vi) a turbid water drainage step of draining turbid water including turbidity components separated from the filter media of the upper and the lower layers by continuing the supply of the upward stream at the upper layer cleaning speed.

Advantageous Effects of Invention

According to the first constitution of the present invention, the cleaning apparatus includes the pair of horizontal air pipes connected to the air suction pipes in such a manner as to communicate with the air suction pipes having the upper end portions open to the atmosphere and extending in the horizontal direction along the horizontal cleaning water pipes to be fixed to the rotary horizontal cleaning water pipes and the horizontal air pipes are configured to communicate with each of the surface-cleaning special air mixing nozzles via the connection pipe. In this manner, as compared to the cleaning nozzle reciprocation type and the rotary cleaning type of the conventional apparatuses performing the stirring of a filter medium only during the passing of the cleaning nozzles, cleaning efficiency per unit time can be remarkably improved, thereby promoting high speed filtering.

In addition, by using the surface-cleaning special air mixing nozzles, the depth of the filter layer allowing for scouring stirring can be increased by 20% or more as compared to the cleaning apparatus of Patent Literature 2 using only cleaning water, so that the filtering efficiency can be improved, thereby increasing the filtering speed.

In addition, any large amount of power and any complicated mechanism as in the cleaning nozzle reciprocation type are not needed, so that production cost for apparatus can be saved and the filtering tank can be formed into a circular shape in plan view. Accordingly, there can be provided a water treatment apparatus that is compact, simple in mechanism, and easy in maintenance.

According to the second constitution of the present invention, the rotational speed of the horizontal cleaning water pipes is set to be in the range of 3 to 5 rounds/minute. By doing this, stirring and cleaning do not extend to the lower layer during the cleaning of the upper layer. Thus, a maximum cleaning efficiency is obtainable while limiting the filter layer that can be cleaned and stirred to the upper layer, thereby achieving a maximum filtering speed.

According to the third constitution of the present invention, the upper limit value of the water supply pressure is 0.2 MPa and the inclination angle of the surface-cleaning special air mixing nozzles with respect to the vertical planes from the axial centers of the horizontal cleaning water pipes at the water supply pressure of 0.2 MPa is in the range of 18 to 22 degrees, whereby a maximum cleaning effect can be achieved while minimizing the power for supplying cleaning water.

According to the fourth constitution of the present invention, at the upper end portion of the air suction pipe, there is provided noise production preventing means with an open hole communicating with the air suction pipe, in which the diameter of the open hole is gradually enlarged toward the open end portion at the upper end portion of the hole to form the taper including the upper lid with at least one small hole. By doing this, noise occurring during the cleaning of the filter layer can be reduced by the simple apparatus, so that even when the space for installation of the water treatment apparatus is narrow, the apparatus can be operated without causing any noise production problem.

According to the fifth constitution of the present invention, the filter layer comprises the two-layer structure of the upper layer and the lower layer and the upper layer comprises a filter medium with a smaller specific gravity and a larger particle size than the filter medium of the lower layer. Then, by performing partial cleaning and overall cleaning of the filter layer thus formed, a high concentration of iron caught in the upper layer is cleaned away through frequent cleanings of the upper layer by a partial cleaning using the combination of the upper layer cleaning apparatus having the above structure and the cleaning using an upward stream with a relatively moderate flow speed. On the other hand, a low concentration of manganese caught in the lower layer is cleaned away together with the iron in the upper layer by an overall cleaning using an upward stream with a high flow speed performed at a less frequency than the cleaning of the upper layer. Accordingly, iron highly concentrated and accumulated in large amount in the upper layer is sufficiently removed by the frequent cleanings, whereas manganese less concentrated and accumulated in small amount in the lower layer is sufficiently removed by the overall cleaning performed at less frequency. Therefore, the life of an organism existing in the lower layer is not hindered by frequent cleanings and the cleaning effect for the upper and the lower filter layers as a whole can be maximally achieved, thereby achieving a required high speed filtering. The present invention can achieve a filtering speed of 400 to 500 m/day, which is more innovative as compared to the filtering speed of 60 to 120 m/day of the water treatment apparatus described in Patent Literature 1. In addition, for the removal of iron in the upper layer, it is unnecessary to frequently perform overall cleaning by reverse cleaning water requiring a large amount of water. As a result, a total amount of cleaning water used is saved. Furthermore, although the amount of cleaning water used in the conventional chemical-addition type water treatment apparatus is about 10 to 15% of the amount of filtered water, the present invention can reduce the amount thereof to about 3 to 5% of the amount of filtered water.

In addition, according to the present invention, the upper layer more frequently cleaned comprises a filter medium with a relatively small specific gravity and a relatively large particle size. Accordingly, during the cleaning of the upper layer, the filter medium is stirred up and soars highly upward to increase the cleaning effect for the filter medium and an amount of cleaning water required to obtain the same cleaning effect can be minimized. On the other hand, since the lower layer comprises a filter medium with a relatively large specific gravity and a relatively small (fine) particle size, the layer has a large specific surface area per unit capacity and thus has high biological treatment effect. Additionally, although the filter media of both the upper and the lower layers are stirred together during overall cleaning, the filter medium of the lower layer has a larger specific gravity and thus has a larger sedimentation speed than the filter medium of the upper layer. Thus, the filter medium of the lower layer settles out to be allowed to stand on the lower layer before settling of the filter medium of the upper layer, and then, the filter medium of the upper layer settles out to be allowed to stand thereon, thereby returning to the initial state of the upper layer and the lower layer. By the combination of the filter medium of the upper layer where high cleaning effect is obtained and the filter medium of the lower layer where high biological treatment effect is obtained, a maximum cleaning efficiency can be obtained while sufficiently catching iron, manganese, and other turbid substances contained in raw water. Furthermore, since the upper layer comprises a filter medium with a relatively large particle size, resistance of the layer to the stream of water is small, so that high speed filtering can be promoted.

DESCRIPTION OF EMBODIMENTS

Hereinafter, embodiments of the present invention will be described with reference to the attached drawings.

A cleaning apparatus according to the present invention is applicable not only to a water treatment apparatus including a filter layer comprising a two-layer structure of an upper layer and a lower layer but also to a water treatment apparatus including a filter layer comprising a one-layer structure. In the description hereinbelow, some preferable embodiments will be described by exemplification of the cleaning apparatus of the present invention applied to a water treatment apparatus including a filter layer comprising a two-layer structure of an upper layer and a lower layer.

Figure 1:
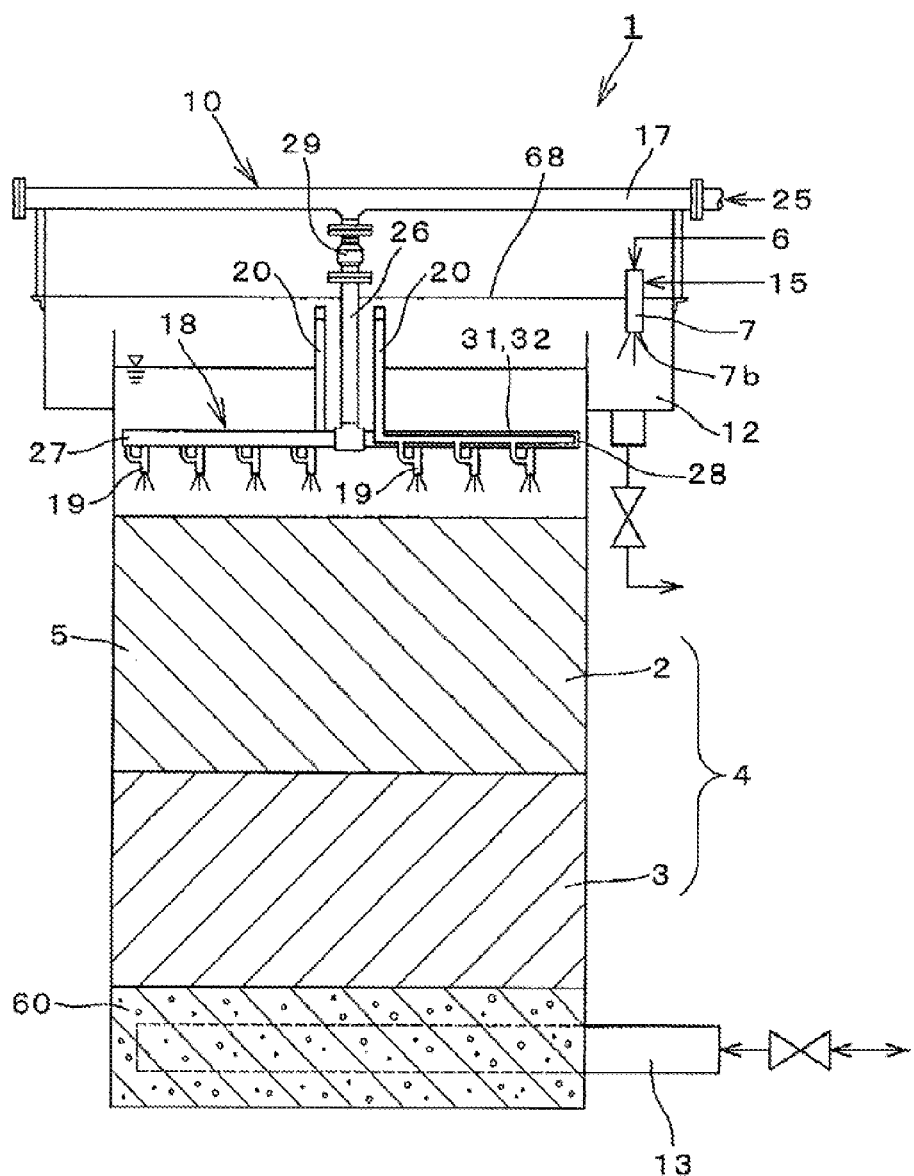
FIG. 1 is a schematic cross-sectional view schematically illustrating an embodiment of an upper layer cleaning apparatus of a water treatment apparatus according to the present invention.
Figure 2:
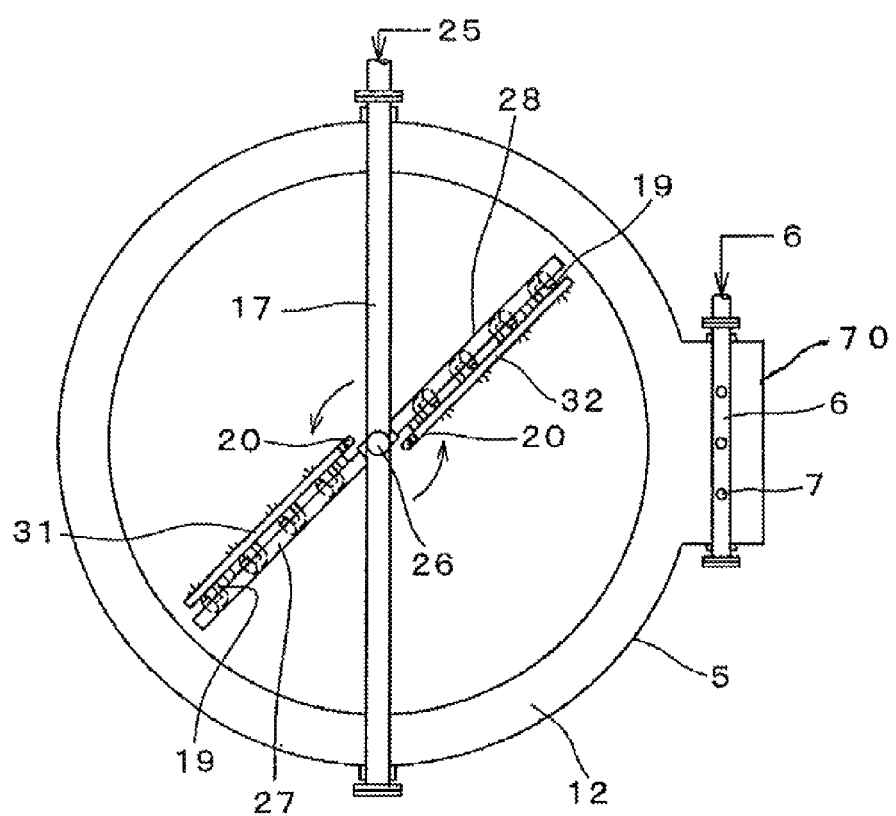
FIG. 2 is a plan view depicting the embodiment.

FIGS. 1 and 2 are schematic diagrams schematically illustrating an embodiment of a water treatment apparatus according to the present invention.

In FIG. 1, a water treatment apparatus 1 includes, as main structural elements, a filtering tank 5 housing a filter layer 4 comprising an upper layer 2 and a lower layer 3, a raw water supply pipe 6, raw water special air mixing nozzles 7, an upper layer cleaning apparatus 10, a drainage trough or drainage outlet 12, and a water collection pipe 13 serving both as a filtered water removal pipe and a reverse cleaning water supply pipe. The filtering tank 5 is covered with a lid 68.

The raw water supply pipe 6 comprising a steel pipe or the like for supplying ground water to be filtered to the filtering tank 5 is connected to a water supply pump (not shown). The water supply pump receives raw water from a water source of the raw water through a water receiving tank (not shown) as needed and supplies the raw water to the raw water supply pipe 6 at a predetermined flow speed.

The raw water supply pipe 6 is arranged above the filtering tank 5 in such a manner as to extend onto a plane parallel to a surface of the filter layer 4. In the embodiment shown in the drawings, the raw water supply pipe 6 is, as depicted in FIG. 2, arranged so as to pass above a raw water inflow tank 70 formed by extending a part of the drainage trough 12 outwardly in a radial direction of the filtering tank and attached to both ends of the raw water inflow tank 70.

One or a plurality of pieces (three pieces, in the embodiment shown in the drawings) of raw water special air mixing nozzles 7 are provided so as to be branched vertically from the raw water supply pipe 6. An end portion of the upstream side of each jet nozzle 7 is fitted in the raw water supply pipe 6 such that the inside of the nozzle is communicated with the raw water supply pipe 6 and at an end portion of the downstream side thereof is formed a raw water ejection outlet 7b for ejecting raw water as a jet water stream. The raw water special air mixing nozzles 7 have an inner diameter of preferably about 3 to 30 mm. The position of the raw water special air mixing nozzles is not limited to the position described above. The nozzles 7 may be arranged at a predetermined interval between the raw water ejection outlet 7b and the surface of the filter layer 4 or a bottom surface of the drainage trough 12 above the filter layer or the drainable trough.

The raw water special air mixing nozzles 7 are provided with air inlets 15 in the same number (three pieces, in the embodiment of the drawings) as the nozzles 7. Each of the air inlets 15 is open to the atmosphere. The air inlets 15 have an inner diameter preferably not less than the inner diameter of the nozzles.

In the filtering tank 5, a filter medium filled in the upper layer 2 of the filter layer 4 needs to be a material having a smaller specific gravity and a larger particle size than a filter medium filled in the lower layer 3. Preferable examples of a filter medium of the upper layer satisfying the above conditions include anthracite or the like and particularly preferred is anthracite (particle size: about 1.2 mm). In addition, as a filter medium of the lower layer satisfying the above conditions, preferred is filter sand (particle size: about 0.6 mm). The filtering layer 4 serves to filter raw water by catching oxide flocks and other foreign substances in raw water supplied as a jet stream supplied from the each jet nozzle, as well as serves to allow iron bacteria and other microorganisms living in the tank to oxidize and adsorb iron and manganese in raw water. Due to autocatalysis of iron oxyhydroxide, iron is formed into a film mainly on the surface of the upper layer 2 (iron is mostly present in a region about 300 mm deep from the surface of the filter layer), whereas manganese is, due to biological treatment, formed into a film mainly on a filter sand surface of the lower layer 3 (manganese is mostly present in a region about 300 to 1300 mm deep from the surface of the filter layer).

The filter layer 4 is supported by a support gravel layer 60. Preferably, the support gravel layer 17 comprises a plurality of layers including a small particle size layer, a medium particle size layer, and a large particle size layer in this order from the top layer, although not limited thereto.

Figure 9:
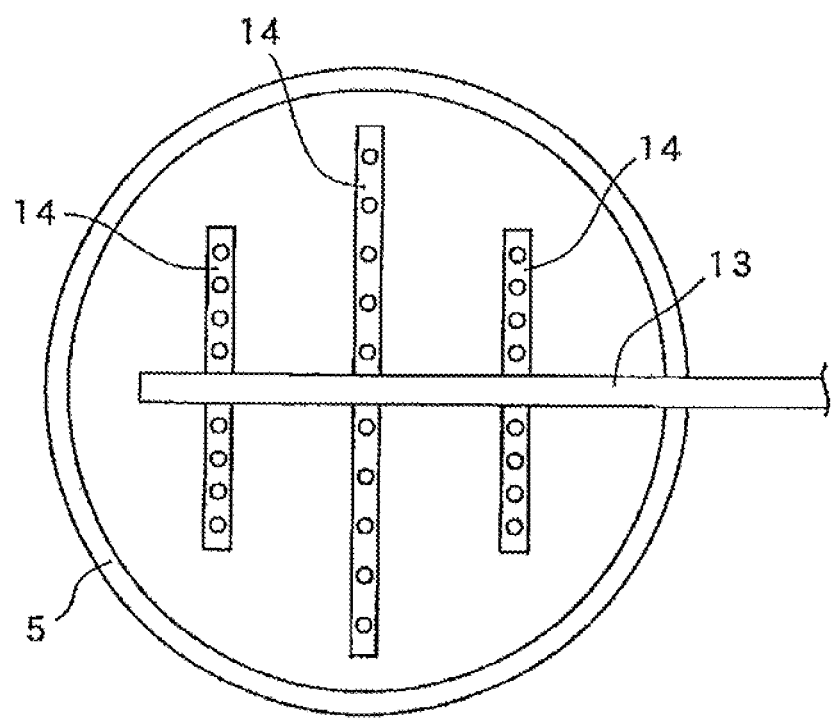
FIG. 9 is a plan view depicting an arrangement state of a water collection pipe.

In the center part of the support gravel layer 17 of the filtering tank 5, the water collection pipe 13 is horizontally arranged. In the present embodiment, the water collection pipe 13 serves as both the filtered water removal pipe for removing water filtered by the filter layer 4 and the reverse cleaning water supply pipe for supplying reverse cleaning water to the filter layer 4. A plurality of branch pipes 14 are attached to the water collection pipe 13, as depicted in FIG. 9, in such a manner as to be branched and horizontally extend to communicate with the water collection pipe 13. The filtered water removal pipe and the reverse cleaning water supply pipe are not limited to the above example and a filtered water removal pipe and a reverse cleaning water supply pipe may be separately provided.

In a part of the filtering tank 5 upper than the surface of the upper layer 2 is provided the drainage trough 12 for draining water overflowing during reverse cleaning. In order to drain water overflowing during reverse cleaning, instead of the drainage trough 12, a drainage outlet having another shape may be used. In the embodiment depicted in FIG. 2, the drainage trough 12 also serves to move raw water supplied from the raw water special air mixing nozzles to the filtering tank.

In the embodiment of FIG. 1, the upper layer cleaning apparatus 10 includes an upper layer cleaning pipe support member 17 communicating with an upper layer cleaning water supply pipe 25 and arranged above in the radial direction of the filtering tank 5, an upper layer cleaning water pipe 18 comprising a center cleaning water pipe 26 communicating with the upper layer cleaning pipe support member 17 and rotatably attached to the support member 17 by a swivel joint 29 and extending in a vertical direction and a pair of horizontal cleaning water pipes 27 and 28 connected to a lower end portion of the center cleaning water pipe 26 so as to communicate therewith and extending horizontally on both sides of the radial direction, a plurality of surface-cleaning special air mixing nozzles each having an ejection outlet protruding diagonally downward in a circumferential direction of the filtering tank 4 from the pair of horizontal cleaning water pipes 27 and 28, which are surface-cleaning special air mixing nozzles 19 in which directions of the ejection outlets of the nozzles of the horizontal cleaning water pipe 27 as one of the pair are opposite to directions of the ejection outlets of the nozzles of the horizontal cleaning water pipe 28 as the other one of the pair, at least one air suction pipe 20 fixed to the center cleaning water pipe 26 and extending vertically, and a pair of horizontal air pipes 31 and 32 connected the air suction pipe 20 so as to communicate therewith and extending horizontally along the horizontal cleaning water pipes 27 and 28 to be fixed to the horizontal cleaning water pipes 27 and 28. The horizontal air pipes 31 and 32, respectively, are communicated with each of the surface-cleaning special air mixing nozzles 19 by a connection pipe described below and an upper end portion of the air suction pipe 20 is open to the atmosphere and positioned upper than the drainage trough 12.

Next, with reference to FIGS. 3 to 8, a description will be given of a more specific embodiment of the upper layer cleaning apparatus of the present invention.

Figure 3:
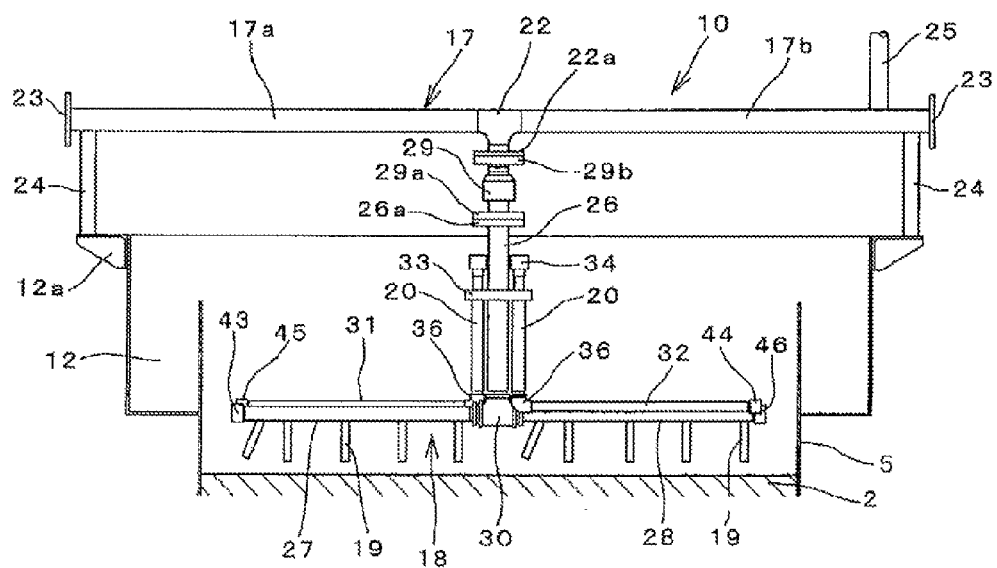
FIG. 3 is a side view depicting a more specific embodiment of the upper layer cleaning apparatus of FIG. 1.

In FIG. 3, the upper layer cleaning apparatus 10 includes the upper layer cleaning pipe support member 17, the upper layer cleaning water pipe 18, the surface-cleaning special air mixing nozzles 19, the air suction pipe 20, and a horizontal air pipe 21.

The upper layer cleaning pipe support member 17 comprises a pair of pipe members 17a and 17b arranged so as to extend in a horizontal direction and connected to each other by a three-way tube joint and both ends thereof are closed by disk-shaped flanges 23 and 23. The upper layer cleaning pipe support member 17 is fixed to an outer peripheral flange portion 12a of the drainage trough 12 by a pair of supporting posts 24 and 24 fixed to bottom walls of both end portions thereof. One end portion of the upper layer cleaning pipe support member 17 is communicated with the upper layer cleaning water supply pipe 25 and can receive upper layer cleaning water supplied from an upper layer cleaning water supplying source (not shown) connected to the upper layer cleaning water supply pipe 25.

The upper layer cleaning water pipe 18 comprises the center cleaning water pipe 26 and the pair of horizontal cleaning water pipes 27 and 28

The center cleaning water pipe 26 comprises a pipe body extending in a vertical direction in a center position of the filtering tank 5, and a disk-shaped flange 26a provided on an upper end portion thereof is welded and fixed to a disk-shaped flange 29a at a lower end portion of the swivel joint 29 arranged above the center cleaning water pipe 26. At an upper end portion of the swivel joint 29 is provided a disk-shaped flange 29b. The flange 29b is welded and fixed to a disk-shaped flange 22a provided at a lower opening portion of the pipe joint 22. Center portions of all the disk-shaped flanges 26a, 29a, 29b, and 22a are open, whereby the center cleaning water pipe 26 is communicated with the upper layer cleaning pipe support member 17 and also rotatably attached to the support member 17.

The pair of horizontal cleaning water pipes 27 and 28 is connected to each other by a three-way pipe joint 30. The horizontal cleaning water pipes 27 and 28 also are connected to a lower end portion of the center cleaning water tube 26 to communicate with the center cleaning water pipe 26 and extend horizontally on both sides of a radial direction from the lower end portion of the center cleaning water pipe 26. End portions of the horizontal cleaning water pipes 27 and 28 opposing the portions thereof connected to the center cleaning water pipe 26 are closed by caps 43 and 44.

The horizontal cleaning water pipes 27 and 28, respectively, are provided with the plurality of surface-cleaning special air mixing nozzles 19 (respective five pieces in the example of the drawing) with the ejection outlets protruding diagonally downward in the circumferential direction of the filtering tank 5. The directions of the ejection outlets of the nozzles of the horizontal cleaning water pipe 27 as the one of the pair are opposite to the directions of the ejection outlets of the nozzles of the horizontal cleaning water pipe 28 as the other one of the pair.

In the embodiment of FIG. 3, among the nozzles 19, the ejection outlet of a nozzle 19 at a left end of the horizontal cleaning water pipe 27 in the drawing is arranged to be off the circumferential direction and oriented toward an inner wall side of the filtering tank 5, thereby facilitating stirring and cleaning of the filter medium at an outer peripheral end portion of the upper layer. In addition, the ejection outlet of a nozzle 19 at a left end of the horizontal cleaning water pipe 28 in the drawing is arranged to be off the circumferential direction and oriented toward the center of the filtering tank 5, thereby facilitating stirring and cleaning of the filter medium at the center region of the upper layer.

The pair of air suction pipes 20 and 20 are extended in the vertical direction such that the top end portions thereof open to the atmosphere are positioned upper than the drainage trough 12, and are fixed to the center cleaning water pipe 26 by a metal fixture 33.

Figure 6:
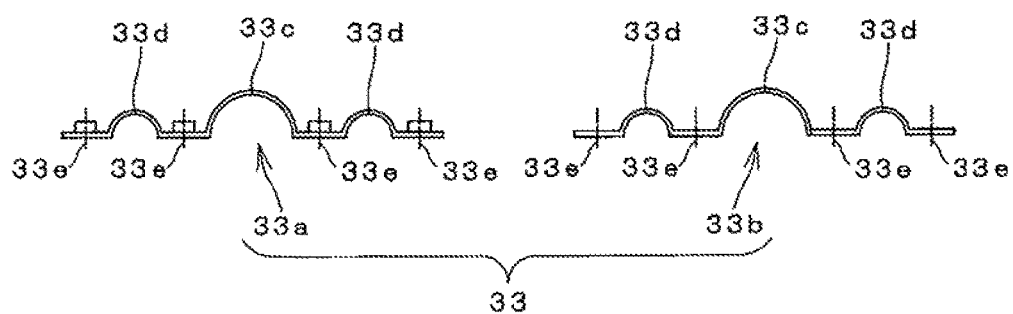
FIG. 6 is a view depicting one example of a metal fixture for fixing an air suction pipe to a center cleaning water pipe.

The metal fixture 33 comprises a pair of metal members 33a and 33b as depicted in FIG. 6. Each of the metal members 33a and 33b is provided with a center cleaning water pipe fitting portion 33c at the center thereof and an air suction pipe fitting portion 33d at both sides thereof. On both sides of the fitting portions 33c and 33d are formed bolt holes 33e. In addition, a nut 34 is welded onto a bolt hole 33e on an outside surface of the metal member 33a as one of the pair.

Figure 7:
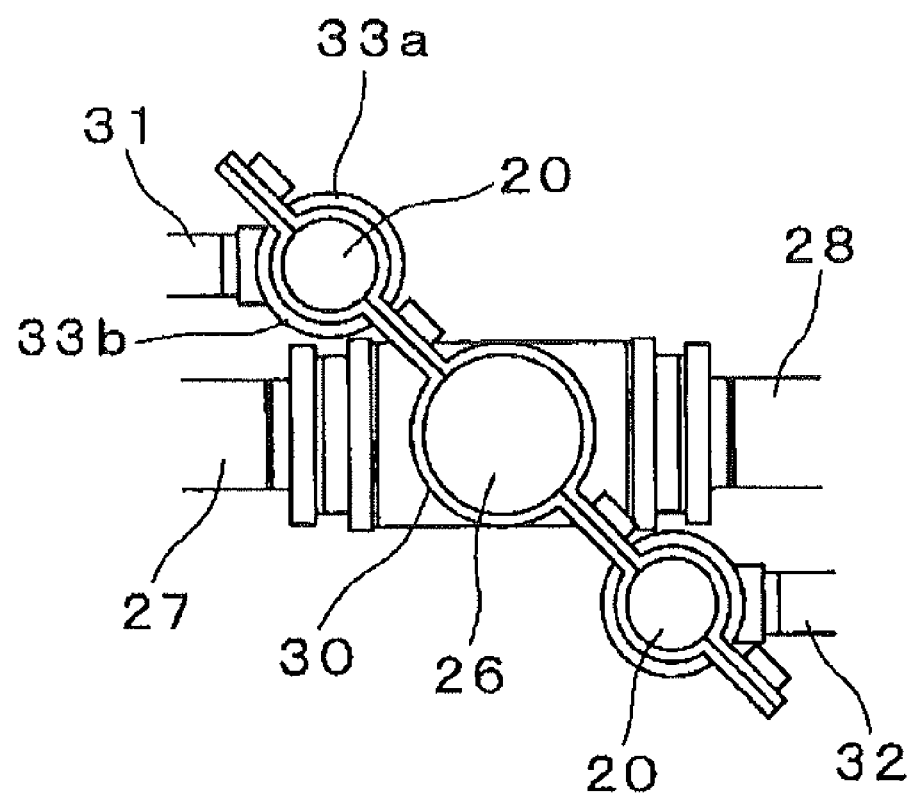
FIG. 7 is a plan view depicting a state in which a pair of air suction pipes are fixed to the center cleaning water pipe by the metal fixture of FIG. 6.

As depicted in FIG. 7, the metal members 33a and 33b are attached in such a manner that the center cleaning water pipe fitting portion 33c is fitted into the center cleaning water pipe 26 and the air suction pipe fitting portions 33d are fitted into the air suction pipes 20, bolts are screwed into the bolt holes 33e of both the metal members 33a and 33b to fasten both the metal members 33a and 33b, so that the air suction pipes 20 and 20 can be fixed to the center cleaning water pipe 26.

Figure 4:
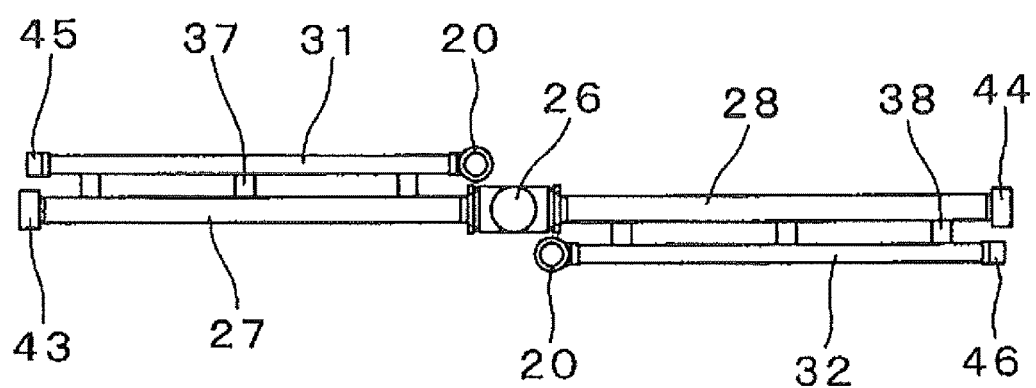
FIG. 4 is a plan view depicting an arrangement of a horizontal cleaning water pipe and a horizontal air pipe in the embodiment of FIG. 3.
Figure 5:
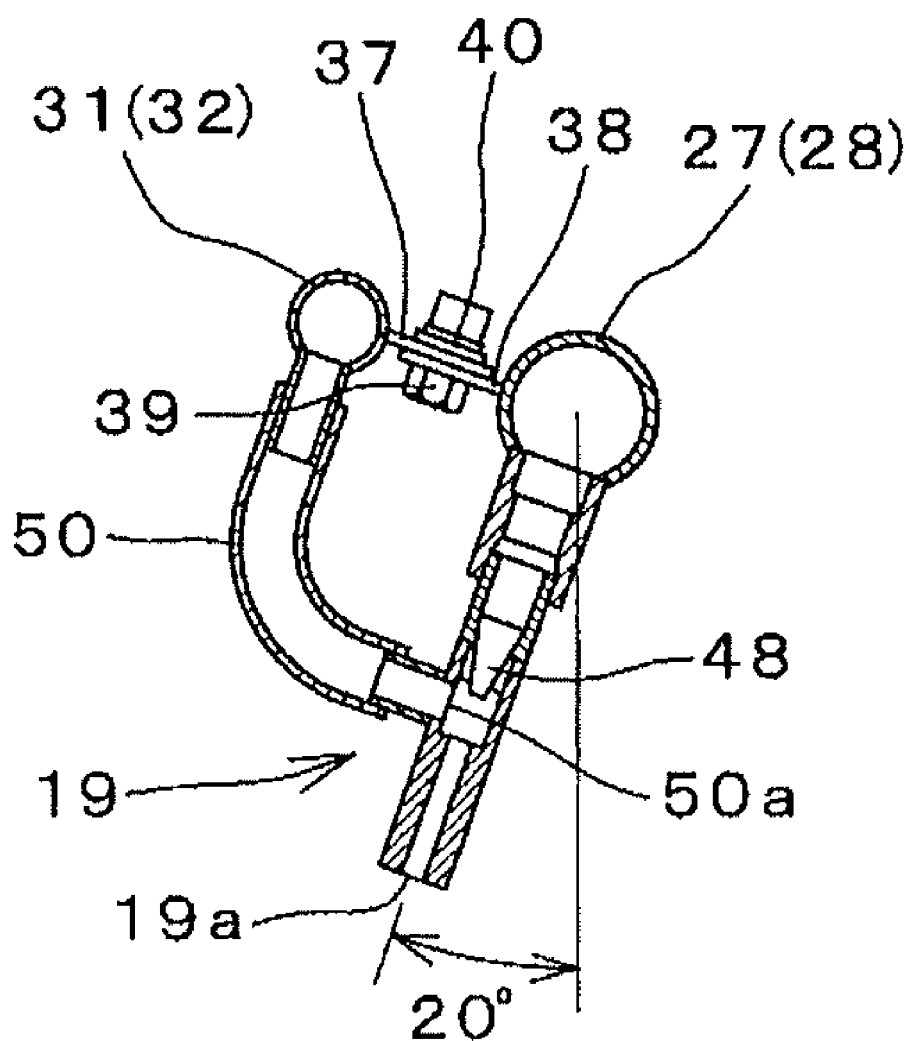
FIG. 5 is a cross-sectional view depicting a structure of one example of the upper layer cleaning apparatus equipped with surface-cleaning special air mixing nozzles.

The horizontal air pipes 31 and 32, respectively, are connected to the air suction pipes 20 and 20, respectively, so as to communicate with the air suction pipes 20 and 20 via pipe joints 36 and 36, respectively. The horizontal air pipes 31 and 32, respectively, extend horizontally in parallel to the horizontal cleaning water pipes 27 and 28, respectively. As depicted in FIG. 5, metal fixtures 37 and 38 (FIG. 4), respectively, are welded, at predetermined intervals, to sides of the horizontal air pipes 31 and 32 and the horizontal cleaning water pipes 27 and 28 opposing to each other, and a bolt insertion through hole (not shown) is formed in each of the metal fixtures 37 and 38. As depicted in FIG. 5, the horizontal air pipes 31 and 32 and the horizontal cleaning water pipes 27 and 28 can be fixed to each other by stacking the metal fixtures 37 and 38 on top of each other, then inserting a bolt 39 into the bolt insertion through holes thereof and fastening with a nut 40. End portions of the horizontal air pipes 31 and 32 opposite to the pipe joints 36 are closed by caps 45 and 46.

In each of the surface-cleaning special air mixing nozzles 19, as depicted in FIG. 5, near an ejection outlet of a jet water ejection nozzle 48 ejecting cleaning water as a jet water stream from the horizontal cleaning water pipe 27 or 28, there is formed a top opening portion 50a of a connection pipe 50 consisting of a hose or the like, a connection pipe 50 communicates with the horizontal air pipes 31 and 32 and the horizontal cleaning water pipes 27 and 28 and mutually connects the horizontal air pipes 31 and 32 and the horizontal cleaning water pipes 27 and 28. With pressure of the jet water stream, air is sucked from the upper end portion of the air suction pipe 20 open to the atmosphere, then mixed with the jet water stream, and ejected from a nozzle outlet 19a.

Figure 8:
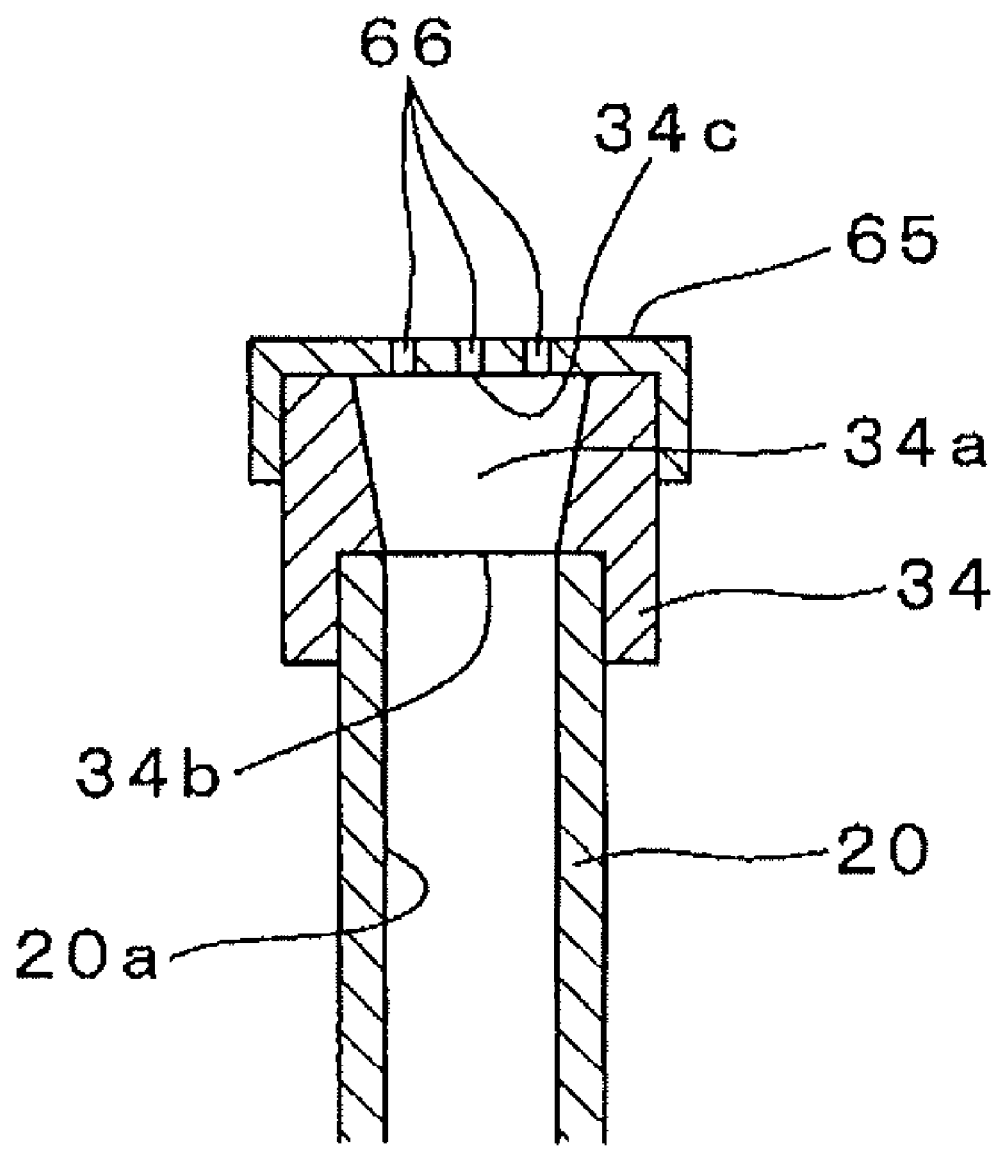
FIG. 8 is a cross-sectional view depicting a screwed socket forming noise production preventing means.

A screw socket 34 is screwed in the top end portion of each of the air suction pipes 20 and 20. In the socket 34, the center portion thereof is vertically open to form an open hole 34a, as depicted in FIG. 8. A lower end portion 34b of the open hole 34a at the screwed position has the same diameter as that of a center hole 20a of the air suction pipe 20 to be coincident with the center hole 20a, while a taper is provided by gradually enlarging the diameter toward an open end portion 34c at an upper end portion of the open hole 34a. The upper end portion of the socket 34 is covered with an upper lid 65 with small holes 66. In this manner, during operation of the upper layer cleaning apparatus, noise occurring when air is sucked from the upper end portion of the air suction pipe 20 is significantly reduced, so that upper layer cleaning work can be performed in a state that is substantially the same as a non-operation state and does not substantially cause noise damage outside the water tank.

Noise during nozzle ejection by the upper layer cleaning apparatus performed directly onto a water surface and in a submerged state was measured by setting the water supply pressure to 0.2 MPa, the number of rotations of the upper layer cleaning water pipe to 4 rounds/minute, and the inclination angle of the surface-cleaning special air mixing nozzles to 20 degrees. The results were as in Table 1 below (unit: dB):

TABLE 1

|  | Inside water tank (non-operation state) | Outside water tank (non-operation state) |
|---|---|---|
| Ejection onto water surface | 84.2 (50.0) | 62.2 (57.7) |
| Ejection in submerged state | 73.3 (50.0) | 59.7 (59.7) |

Next, with reference to FIGS. 1 and 2, a description will be given of the action of the water treatment apparatus including the upper layer cleaning apparatus according to the present invention.

During the filtering of raw water, while maintaining the depth of water on the surface of the upper layer 2 to a predetermined depth, raw water is supplied from the water supply pump to the raw water special air mixing nozzles 7 via the raw water supply pipe 6 and the flow rate of the water in the jet nozzles 7 is set, for example, to 5.8 to 256 litters/minute to turn the raw water into a jet water stream. On the other hand, air in an amount of, for example, 1.0 to 1.5 times the amount of the water is introduced into the raw water special air mixing nozzles 7 from the air inlets 15 open into the jet nozzles 7, whereby the jet water stream involves the air to produce a large number of small air bubbles and the air-mixed jet water streams including the large number of air bubbles are discharged from the raw water ejection outlets 7b of the jet nozzles 7 into water on the upper layer 2, thereby causing dissolved oxygen in the water to be close to a saturation state. Iron in the water reacts with the dissolved oxygen to be caught as iron hydroxide on the surface of the filter medium. In this manner, soluble components such as the iron in the water are oxidized into insoluble components, whereby the iron component is caught mainly on the surface of anthracite particles forming the upper layer 2 and the manganese component is caught mainly by biological treatment by bacteria activated by the high concentration of dissolved oxygen on the surface of filter sand particles forming the lower layer 3. After filtering these insoluble components and other foreign substances by the filter layer 4, the filtered water is removed outside from the water collection pipe 13 serving as the filtered water removal pipe.

With the continuation of the above filtering operation, oxide flocks and other foreign substances accumulate on the surface of the upper layer 2 as time passes, whereby the surface region of the upper layer 2 is covered with the flocks and other foreign substances, causing clogging and then resulting in blocking, which reduces the filtering function of the filter layer 4. Due to the occurrence of clogging in the upper layer surface region, the water level on the upper layer surface gradually rises. Thus, when the water level reaches a certain level, either one of the following partial cleaning step and overall cleaning step is selected and performed to clean the filter layer 4.

Partial Cleaning Process (1) A filtering treatment suspension step is performed to temporarily stop the supply of the raw water.

(2) An upper layer cleaning step is performed in which while loosening the upper layer by introducing reverse cleaning water at an upper layer cleaning speed (for example, 30 m/h) from the water collection pipe 13 serving as the reverse cleaning water supply pipe during reverse cleaning, the upper layer cleaning apparatus 10 is operated to stir the filter medium of the upper layer 2 by air-mixed jet streams ejected from the surface-cleaning special air mixing nozzles 19 and rub the filter medium so as to separate iron hydroxide blocking the surface of the filter medium and clean away the component by an upward stream of the reverse cleaning water. The reverse cleaning water is supplied at a relatively low upper layer cleaning speed to discharge a separated sludge to the drainage trough.

(3) A turbid water drainage step is performed in which reverse cleaning water is introduced at the upper layer cleaning speed from the water collection pipe 13 to clean the filter media of the lower layer 3 and the upper layer 2 by an upward stream so as to drain water including an iron component mainly caught in the upper layer from the drainage trough 12.

Overall Cleaning Process (1) A filtering treatment suspension step is performed in which the supply of the raw water is stopped to perform filtering treatment until the level of the water descends to a position close to the surface of the filter medium of the upper layer or a predetermined height in the upper layer.

(2) A cleaning step is performed in which reverse cleaning water is introduced at an overall cleaning speed (for example, 60 m/h) larger than the upper layer cleaning speed and faster than speeds of sedimentation of the filter media to clean the filter media of the lower layer 3 and the upper layer 2 by a rapid upward stream.

(3) A standing step of causing sedimentation of the filter media of the upper layer and the lower layer while supplying an upward stream at a speed not more than the speeds of the sedimentation of the filter media after finishing the cleaning of the filter media of the upper layer and the lower layer.

(4) A turbid water drainage step of draining turbid water including turbidity components separated from the filter media of the upper and the lower layers from the drainage trough 12 by continuing the supply of the upward stream at the upper layer cleaning speed.

Regarding the selection of either the partial cleaning process or the overall cleaning process, according to the concentration ratio of iron and manganese in raw water, the filtering treatment speed, and the like, respective frequencies of the partial cleaning process and the overall cleaning process may be determined. Then, according to the frequencies, either one of the processes may be selected, and after that, the partial cleaning and the overall cleaning may be performed at the respective frequencies determined.

In addition, in another embodiment of the present invention, a resistance value of the filtering tank 5 during normal operation for filtering treatment is measured and when the resistance value becomes a predetermined value or higher, the partial cleaning process is automatically started. In order to measure the resistance value, a differential pressure of the filtering tank may be measured using a differential pressure gauge or when a water level measured by a water level gauge rises up to a predetermined value, the risen water level may be regarded as a predetermined resistance value. By doing this, when clogging is caused to such an extent to require cleaning of the upper layer of the filter layer, the partial cleaning process is automatically started, which can therefore be more efficient than performing the partial cleaning process according to a predetermined schedule.

As another method, the partial cleaning may be set so as to be performed when the resistance value of the filtering tank reaches a predetermined value (automatically or the predetermined value may be measured as needed), and when the time it takes for the resistance value to reach the predetermined value after the partial cleaning becomes a predetermined time or less, the overall cleaning process may be performed.

EXAMPLES

Hereinafter, a description will be given of Examples using the upper layer cleaning apparatus depicted in FIGS. 3 to 5.

The filtering tank of the water treatment apparatus is a tank with an inner diameter of 1800 mm in circular shape in plan view, and the depth of the upper layer from the surface of the filter layer is 700 mm and the depth of the lower layer from the top surface thereof is 1800 mm. In the upper layer cleaning apparatus, the center cleaning water pipe has an inner diameter of 50 mm, the horizontal cleaning water pipes have an inner diameter of 32 mm, the air suction pipes have an inner diameter of 32 mm, the horizontal air pipes have an inner diameter of 20 mm, and the ejection outlets of the surface-cleaning special air mixing nozzles have an inner diameter of 4.5 mm.

Using the upper layer cleaning apparatus, a relationship between the number of rotations and water supply pressure of the horizontal cleaning water pipes and a relationship between the number of rotations of the horizontal cleaning water pipes and the inclination angle of the nozzles were investigated by variously changing the inclination angle against vertical planes from the axial centers of the horizontal cleaning water pipes and water supply pressure of the surface-cleaning special air mixing nozzles. As a result, FIG. 10 indicates the obtained relationship between the number of rotations and the water supply pressure and FIG. 11 indicates the obtained relationship between the number of rotations and the inclination angle of the nozzles.

In addition, the results of the experimentation showed that the rotational speed for rotating the horizontal cleaning water pipes of the upper layer cleaning apparatus is preferably in a range of 3 to 5 rounds/minute. When the number of rotations is less than 3 rounds/minute, cleaning efficiency is poor and it is difficult to perform an intended high-speed filtering. On the other hand, when the number of rotations exceeds 5 rounds/minute, cleaning is performed not only on the upper layer intended but also on an upper layer portion of the lower layer not intended, thereby indicating that there occurs a problem with washing away an organism living in the lower layer and necessary to remove manganese.

Figure 10:
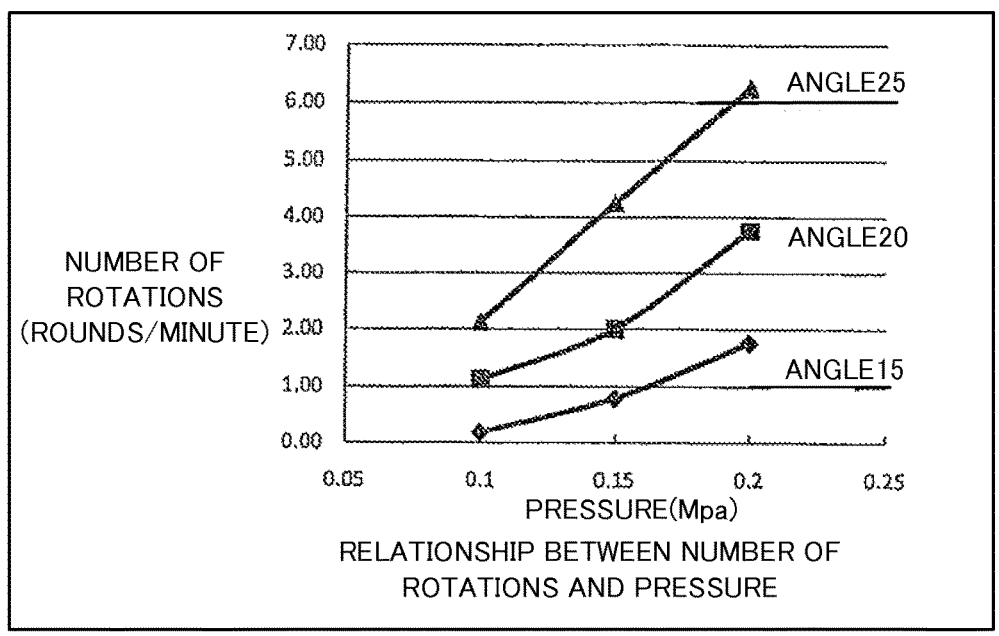
FIG. 10 is a graph depicting a relationship between the number of rotations and water supply pressure of the upper layer cleaning apparatus.

Then, regarding pressures capable of obtaining the number of rotations ranging from 3 to 5 rounds/minute, FIG. 10 indicates that an appropriate range of water supply pressure is about 0.12 to 0.165 MPa at a nozzle inclination angle of 25 degrees, about 0.185 to 0.26 MPa at a nozzle inclination angle of 20 degrees, and about 0.24 MPa or more at a nozzle inclination angle of 15.

Figure 11:
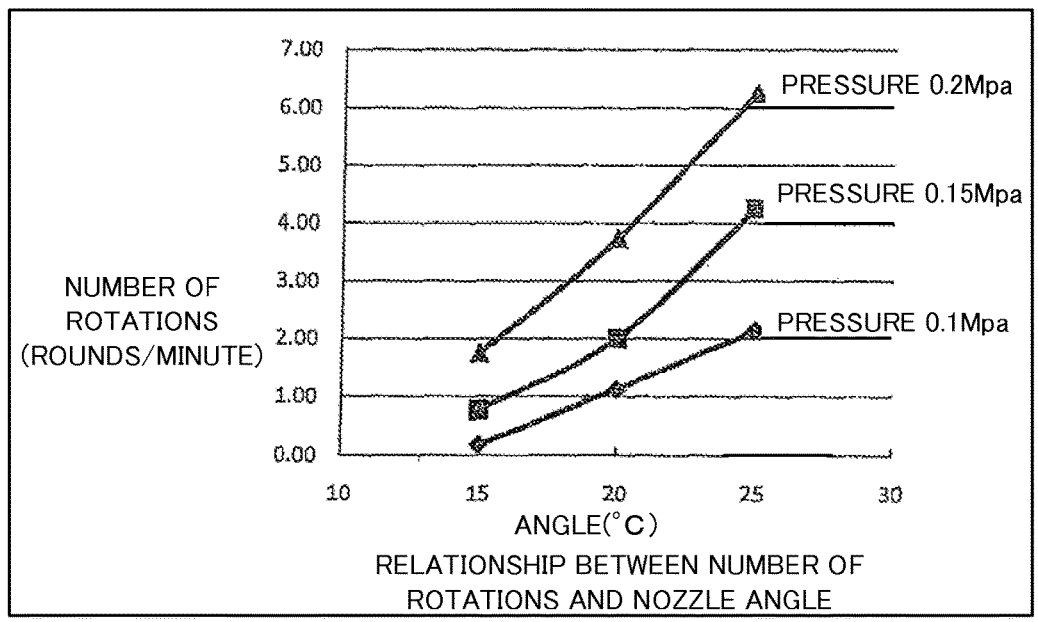
FIG. 11 is a graph depicting a relationship between the number of rotations and an inclination angle of the surface-cleaning special air mixing nozzles of the upper layer cleaning apparatus.

In addition, regarding nozzle inclination angles capable of obtaining the number of rotations ranging from 3 to 5 rounds/minute, FIG. 11 indicates that the inclination nozzle angle is about 18 to 22 degrees at a water supply pressure of 0.2 MPa, about 22 to 27 degrees at a water supply pressure of 0.15 MPa, and about 30 degrees or more at a water supply pressure of 0.1 MPa.

In order to increase the cleaning effect, the water supply pressure is preferably higher. However, when the water supply pressure exceeds 0.2 MPa, cost for water supply power consumed increases, which is unpreferable. When the upper limit value of the water supply pressure is set to 0.2 MPa from the viewpoint of the cleaning effect and the water supply power, the inclination angle of the surface-cleaning special air mixing nozzles against the vertical planes from the axial centers of the horizontal cleaning water pipes capable of obtaining the number of rotations ranging from 3 to 5 rounds/minute is found to be in the range of about 18 to 22 degrees.

Additionally, in the upper layer cleaning apparatus, a comparative experimentation was conducted using a case of cleaning performed by closing the opening portions of the air suction pipes 20 and ejecting only cleaning water from the nozzles 19 (the case of Patent Literature 2) and a case of cleaning performed by sucking air from the air suction pipes 20 and ejecting air-mixed jet water from the nozzles 19 (the case of the present invention). In the ejection of only cleaning water, the depth of the filter layer allowing for stirring from the upper layer surface was 28 cm, whereas in the ejection of the air-mixed jet water, the stirring depth was 36 cm. The results showed that the use of the special air mixing nozzles 19 allows for stirring in a deeper range over about 20% as compared to the ejection of only water.

The invention claimed is:

1. An upper layer cleaning apparatus of a water treatment apparatus, the water treatment apparatus comprising
   a raw water supply pipe,
   one or a plurality of raw water special air mixing nozzles, one end portion each thereof communicating with the raw water supply pipe and at the other end portion each thereof being provided a raw water ejection outlet ejecting raw water as an air-mixed jet water stream of raw water and air;
   a filtering tank in circular shape in planar view, the tank housing a filter layer comprising two layers of an upper layer and a lower layer, the upper layer comprising a filter medium with a smaller specific gravity and a larger particle size than a filter medium of the lower layer;
   a filtered water removal pipe provided in the filtering tank to remove water filtered by the filter layer;
   a reverse cleaning water supply pipe provided in the filtering tank to supply reverse cleaning water to the filter layer;
   a drainage trough or a drainage outlet provided above the filter layer in the filtering tank; and
   an upper layer cleaning apparatus cleaning the upper layer while loosening the filter medium of the upper layer by an upward stream by introducing reverse cleaning water from the reverse cleaning water supply pipe at an upper layer cleaning speed, the raw water special air mixing nozzles being arranged at a predetermined interval above the filter layer or the drainage trough between the raw water ejection outlets and a surface of the filter layer or a bottom surface of the drainage trough, characterized in that the upper layer cleaning apparatus comprises:
   an upper layer cleaning pipe support member communicating with an upper layer cleaning water supply pipe and arranged in a radial direction above the filter layer;
   an upper layer cleaning water pipe comprising a center cleaning water pipe communicating with the upper layer cleaning pipe support member and rotatably attached to the support member and extending vertically and a pair of horizontal cleaning water pipes connected to a lower end portion of the center cleaning water pipe so as to communicate with the center cleaning water pipe and extending horizontally on both sides of a radial direction from the connected portion;
   a plurality of surface-cleaning special air mixing nozzles, an ejection outlet of each thereof protruding from the pair of horizontal cleaning water pipes diagonally downward in a circumferential direction of the filtering tank, a direction of the ejection outlets of the nozzles of one of the horizontal cleaning water pipes being opposite to a direction of the ejection outlets of the nozzles of the other one thereof;
   at least one air suction pipe fixed to the center cleaning water pipe and extending vertically; and
   a pair of horizontal air pipes connected to the air suction pipe so as to communicate with the air suction pipe and extending horizontally along the horizontal cleaning water pipes to be fixed to the horizontal cleaning water pipes,
   the horizontal air pipes communicating with each of the surface-cleaning special air mixing nozzles by a connection pipe and an upper end portion of the air suction pipe being open to an atmosphere and arranged upper than the drainage trough or the drainage outlet;
   and wherein the upper layer cleaning water pipe has a rotational speed in a range of 3 to 5 rounds/minute; and
   the water treatment apparatus has an upper limit value of water supply pressure of surface-cleaning special air mixing nozzles of 0.2 MPa, and an inclination angle of the surface-cleaning special air mixing nozzles with respect to vertical planes that are parallel to axial centers of the horizontal cleaning water pipes is in a range of 18 to 22 degrees when the water supply pressure is 0.2 MPa.

2. The upper layer cleaning apparatus according to claim 1, wherein at the upper end portion of the air suction pipe is provided noise production preventing means with an open hole communicating with the air suction pipe, a diameter of the open hole being gradually enlarged toward an open end portion at an upper end portion of the hole to form a taper including an upper lid with at least one small hole.

3. A method for cleaning the filter layer of a water treatment apparatus, wherein the water treatment apparatus comprises the upper layer cleaning apparatus according to claim 2, and wherein the raw water special air mixing nozzles are arranged at a predetermined interval above the filter layer or the drainage trough between the raw water ejection outlets and a surface of the filter layer or a bottom surface of the drainage trough, the method comprising
   selecting one of a partial cleaning for mainly cleaning the upper layer and an overall cleaning for cleaning both the upper layer and the lower layer based on a resistance value of the filter layer during normal operation for a filtering treatment, the process of the partial cleaning comprising:
   (i) temporarily stopping the supply of the raw water;
   (ii) cleaning of the upper layer of the filter layer by the upper layer cleaning apparatus according to claim 2 while introducing reverse cleaning water as an upward stream from the reverse cleaning water supply pipe at an upper layer cleaning speed to separate iron hydroxide blocking the surface of the filter medium from the filter medium and clean away the iron hydroxide by the upward stream; and (iii) draining turbid water including the turbidity component separated from the filter medium of the upper layer from the drainage trough or the drainage outlet by continuing the supply of the upward stream at the upper layer cleaning speed;

and the process of the overall cleaning comprising:

(i) stopping the supply of the raw water;

(ii) cleaning the filter media of the upper layer and the lower layer by operating the upper layer cleaning apparatus while introducing reverse cleaning water from the reverse cleaning water supply pipe at an overall cleaning speed larger than the upper layer cleaning speed and faster than speeds of sedimentation of the filter media;

(iii) causing the sedimentation of the filter media of the upper and the lower layers while continuing the supply of an upward stream at a speed not more than the speeds of the sedimentation of the filter media after finishing the cleaning of the filter media of the upper layer and the lower layer; and (vi) draining turbid water including turbidity components separated from the filter media of the upper and the lower layers by continuing the supply of the upward stream at the upper layer cleaning speed.

4. A method for cleaning the filter layer of a water treatment apparatus, wherein the water treatment apparatus comprises the upper layer cleaning apparatus according to claim 1, and wherein the raw water special air mixing nozzles are arranged at a predetermined interval above the filter layer or the drainage trough between the raw water ejection outlets and a surface of the filter layer or a bottom surface of the drainage trough, the method comprising selecting one of a. partial cleaning for mainly cleaning the upper layer and an overall cleaning for cleaning both the upper layer and the lower layer based on a resistance value of the filter layer during normal operation for a filtering treatment, the process of the partial cleaning comprising:

(i) temporarily stopping the supply of the raw water;

(ii) cleaning of the upper layer of the filter layer by the upper layer cleaning apparatus according to claim 1 while introducing reverse cleaning water as an upward stream from the reverse cleaning water supply pipe at an upper layer cleaning speed to separate iron hydroxide blocking the surface of the filter medium from the filter medium and clean away the iron hydroxide by the upward stream; and (iii) draining turbid water including the turbidity component separated from the filter medium of the upper layer from the drainage trough or the drainage outlet by continuing the supply of the upward stream at the upper layer cleaning speed;

and the process of the overall cleaning comprising:

(i) stopping the supply of the raw water;

(ii) cleaning the filter media of the upper layer and the lower layer by operating the upper layer cleaning apparatus while introducing reverse cleaning water from the reverse cleaning water supply pipe at an overall cleaning speed larger than the upper layer cleaning speed and faster than speeds of sedimentation of the filter media;

(iii) causing the sedimentation of the filter media of the upper and the lower layers while continuing the supply of an upward stream at a speed not more than the speeds of the sedimentation of the filter media after finishing the cleaning of the filter media of the upper layer and the lower layer; and (vi) draining turbid water including turbidity components separated from the filter media of the upper and the lower layers by continuing the supply of the upward stream at the upper layer cleaning speed.

* * * * *

UNITED STATES PATENT AND TRADEMARK OFFICE
CERTIFICATE OF CORRECTION

PATENT NO. : 9,573,082 B2  
APPLICATION NO. : 14/234966  
DATED : February 21, 2017  
INVENTOR(S) : Hitoshi Mimura, Tadao Oiwa and Hui Liang Cai Page 1 of 1

It is certified that error appears in the above-identified patent and that said Letters Patent is hereby corrected as shown below:

The name of the third listed inventor is corrected from Hui Lang Cai to Hui Liang Cai.

Signed and Sealed this  
Sixth Day of June, 2017

Michelle K. Lee  
*Director of the United States Patent and Trademark Office*